US009522429B2

(12) United States Patent
Suzuyama et al.

(10) Patent No.: US 9,522,429 B2
(45) Date of Patent: Dec. 20, 2016

(54) WORKPIECE MACHINING APPARATUS

(71) Applicant: FUJI MACHINE MFG. CO., LTD., Chiryu-shi (JP)

(72) Inventors: Shigefumi Suzuyama, Toyota (JP); Jun Yanagisaki, Toyota (JP); Yasusi Suenami, Nagoya (JP); Kenji Mizuta, Miyoshi (JP); Osamu Nagai, Nagoya (JP); Shinichi Yamamoto, Nisshin (JP); Naohisa Ito, Toyoake (JP)

(73) Assignee: FUJI MACHINE MFG. CO., LTD., Chiryu-shi (JP)

( * ) Notice: Subject to any disclaimer, the term of this patent is extended or adjusted under 35 U.S.C. 154(b) by 0 days.

(21) Appl. No.: 14/434,615

(22) PCT Filed: Oct. 31, 2012

(86) PCT No.: PCT/JP2012/078218
§ 371 (c)(1),
(2) Date: Apr. 9, 2015

(87) PCT Pub. No.: WO2014/068714
PCT Pub. Date: May 8, 2014

(65) Prior Publication Data
US 2015/0258615 A1 Sep. 17, 2015

(51) Int. Cl.
*B23C 7/02* (2006.01)
*B23C 3/30* (2006.01)
(Continued)

(52) U.S. Cl.
CPC ............. *B23C 3/30* (2013.01); *B23B 3/162* (2013.01); *B23C 3/28* (2013.01); *B23Q 5/045* (2013.01);
(Continued)

(58) Field of Classification Search
CPC .......... B23B 3/065; B23B 3/162; B23B 3/164; B23B 3/167; B23B 11/00; B23B 2270/56; B23Q 37/002; B23C 7/02; Y10T 29/5114; Y10T 29/5109; Y10T 29/5112
(Continued)

(56) References Cited

U.S. PATENT DOCUMENTS 548,822 A * 10/1895 Stirling .................... B23C 3/30
409/143
2,372,913 A * 4/1945 Schmidt .................. B23C 3/30
409/143
(Continued)

FOREIGN PATENT DOCUMENTS

JP 2007-030101 A 2/2007
JP 3158882 U 4/2010

OTHER PUBLICATIONS

International Search Report issued Feb. 5, 2013 in PCT/JP2012/078218 Filed Oct. 31, 2012.

*Primary Examiner* — Daniel Howell
*Assistant Examiner* — Yasir Diab
(74) *Attorney, Agent, or Firm* — Oblon, McClelland, Maier & Neustadt, L.L.P.

(57) ABSTRACT

A workpiece machining apparatus including a headstock to which a workpiece having a through-hole extending in a Z-axis direction is attached; a tool rest which is movable in the Z-axis direction and in an X-axis direction; and a rotary tool unit which is attached to the tool rest, is provided. The headstock has a support member which is movable in the Z-axis direction and which has a spindle side contact portion in an end portion in the Z-axis direction. The rotary tool unit has a tool body having a tool side contact portion with which the spindle side contact portion can come into contact in the Z-axis direction, and a rotatable tool which protrudes from the tool body. The rotating tool machines the workpiece by (Continued)

moving the tool body in the Z-axis direction in a state where the spindle side contact portion and the tool side contact portion are brought into contact with each other.

2 Claims, 8 Drawing Sheets

(51) Int. Cl.
*B23C 3/28* (2006.01)
*B23Q 5/04* (2006.01)
*B23B 3/06* (2006.01)
*B23B 3/16* (2006.01)
*B23Q 37/00* (2006.01)

(52) U.S. Cl.
CPC ............... *B23B 3/065* (2013.01); *B23B 3/164* (2013.01); *B23B 3/167* (2013.01); *B23C 7/02* (2013.01); *B23Q 37/002* (2013.01); *B23Q 2220/002* (2013.01); *Y10T 29/5109* (2015.01); *Y10T 29/5112* (2015.01); *Y10T 29/5114* (2015.01); *Y10T 409/307448* (2015.01)

(58) Field of Classification Search
USPC ................................ 29/27 C, 27 R, 27 A, 40
See application file for complete search history.

(56) References Cited

U.S. PATENT DOCUMENTS

| | | | | |
|---|---|---|---|---|
| 3,955,257 A * | 5/1976 | Herbst | ................ | B23B 29/242 29/36 |
| 4,400,859 A * | 8/1983 | Woythal | ............... | B23Q 1/4857 29/27 C |
| 4,557,644 A * | 12/1985 | Scepanovic | ............... | B23C 3/30 409/143 |
| 4,577,388 A * | 3/1986 | Wood | .................... | B23D 21/02 166/55 |
| 4,722,123 A * | 2/1988 | Pruvot | .................... | B23Q 5/06 29/27 C |
| 5,184,927 A * | 2/1993 | Judy | ........................ | B23C 3/30 409/143 |
| 5,247,740 A * | 9/1993 | Curtis | ................ | B21B 45/0275 29/895.21 |
| 5,779,406 A * | 7/1998 | Astor | ....................... | B23C 3/34 29/888.02 |
| 2005/0188516 A1* | 9/2005 | Schneider | ............... | B23B 3/065 29/27 C |
| 2005/0217095 A1* | 10/2005 | Gstir | ..................... | B23Q 1/012 29/27 C |
| 2009/0047086 A1* | 2/2009 | Liu | ........................ | B24B 41/04 409/231 |

* cited by examiner

WORKPIECE MACHINING APPARATUS

TECHNICAL FIELD

The present disclosure relates to a workpiece machining apparatus which is used in forming keyways, splines, gears, or the like in a workpiece.

BACKGROUND ART

When a keyway is formed in a through-hole of a workpiece, a reciprocating tool such as a slotter and a broach is used. That is, the keyway is formed in the through-hole by causing the reciprocating tool to reciprocate like a chisel in an axial direction of the through-hole.

CITATION LIST

Patent Literature

PTL 1: JP-A-2007-30101

SUMMARY

Technical Problem

However, when the reciprocating tool is used, a tip of the reciprocating tool collides with a body portion of the workpiece in the vertical direction. Accordingly, a sharp tip is required in the reciprocating tool. For this reason, very accurate polishing of a tool tip is required. Therefore, the present inventor has examined a method of forming a keyway in a through-hole of a workpiece by using a rotary tool which does not require very accurate polishing of the tool tip.

However, a rotary tool unit having the rotary tool (radial tool or the like (to be described later)) is supported by a tool rest in a cantilevered manner. The rotary tool is rotated around its own axis. Consequently, there is a possibility that the rotary tool unit may be vibrated or elastically deformed due to a machining load generated by the rotation of the rotary tool. Therefore, there is a possibility that machining accuracy may be degraded.

In this regard, according to an inner surface machining apparatus disclosed in PTL 1, a tool is supported from both sides in a Z-axis direction. However, the tool used in the inner surface machining apparatus disclosed in PTL 1 is a tool for lathe machining (stationary tool), and is not a rotary tool. Accordingly, PTL 1 does not suggest and disclose a solution for the above-described problem (problem in that the machining accuracy may be degraded) which is inherent in the rotary tool.

A workpiece machining apparatus according to the disclosure has been realized in view of the above-described problem. The disclosure aims to provide a workpiece machining apparatus whose machining accuracy is less likely to be degraded.

Solution to Problem

In order to solve the above-described problem, a workpiece machining apparatus according to the disclosure comprises: a headstock to which a workpiece is attached when coordinate axes orthogonal to each other are set to a Z-axis and an X-axis; a tool rest being movable in the Z-axis direction and the X-axis direction; and a rotary tool unit attached to the tool rest, wherein the headstock has a support member being movable in the Z-axis direction, the support member has a spindle side contact portion in an end portion in the Z-axis direction, wherein the rotary tool unit has a tool body having a tool side contact portion with which the spindle side contact portion of the support member can come into contact in the Z-axis direction, and a tool protruding from the tool body and being rotatable around its own axis, wherein the tool which is rotating machines the workpiece by moving the tool body in the Z-axis direction in a state where the spindle side contact portion and the tool side contact portion are brought into contact with each other.

According to the workpiece machining apparatus of the disclosure, by the support member, it is possible to hold the rotary tool unit in the Z-axis direction. Accordingly, it is possible to suppress vibrations or elastic deformation of the tool. Therefore, machining accuracy is less likely to be degraded.

In another embodiment of the disclosure, a configuration may be adopted, wherein when a coordinate axis orthogonal to the Z-axis and the X-axis is set to a Y-axis, the tool protrudes from the tool body in the Y-axis direction, wherein the workpiece has a through-hole which extends in the Z-axis direction, and wherein the tool forms a groove extending in the Z-axis direction in the through-hole by moving the tool body inside the through-hole in the Z-axis direction.

An example of a rotary tool includes a radial tool. The radial tool is used when a hole is bored into an outer peripheral surface of the workpiece. The radial tool is movable in the Z-axis direction (spindle direction) and the X-axis direction (direction orthogonal to the Z-axis) by a slide mechanism. The axial direction of the radial tool is the X-axis direction.

When the hole is bored into the outer peripheral surface of the workpiece, the radial tool is first rotated around its own axis. Thereafter, the rotary tool unit including the radial tool is moved in the Z-axis direction on an outer side in a radial direction of the outer peripheral surface of the workpiece fixed to a chuck. Subsequently, in the coordinates for boring the hole, a movement direction of the rotary tool unit is switched from the Z-axis direction to the X-axis direction. Then, a tip of the rotating radial tool is pressed against the outer peripheral surface of the workpiece. In this manner, the hole extending in the X-axis direction is bored into the outer peripheral surface of the workpiece.

Here, the axial direction (boring direction) of the radial tool is the X-axis direction. In addition, the movement direction of the radial tool is only in the Z-axis direction and the X-axis direction. Accordingly, if the radial tool is diverted into another use when the groove is formed in the through-hole of the workpiece, the Z-axis direction is caused to correspond to an extending direction of the groove, and the X-axis direction is caused to correspond to a depth direction of the groove.

However, in this case, the radial tool cannot be moved in a groove width direction (Y-axis direction=direction orthogonal to the Z-axis and the X-axis). Therefore, a groove width of the groove cannot be widened.

In this regard, according to this configuration, the tool protrudes in the Y-axis direction with respect to the tool rest which is movable in the Z-axis direction and the X-axis direction. The Y-axis direction corresponds to the groove depth direction of the groove. The X-axis direction corresponds to the groove width direction of the groove. Therefore, the groove width of the groove can be widened by moving the tool rest in the X-axis direction.

In addition, if the tool protrudes in the X-axis direction, the X-axis direction is caused to correspond to the groove depth direction of the groove, and the Y-axis direction is caused to correspond to the groove width direction of the groove. Accordingly, in order to ensure a groove width widening function, it is necessary to increase movement of a mechanism (for example, a slide or the like) in the Y-axis direction for the existing tool rest. In contrast, according to this configuration, it is possible to use the existing tool rest (tool rest movable in the Z-axis direction and the X-axis direction) without any change therein. Therefore, the apparatus is very versatile.

In another embodiment of the disclosure, a configuration may be adopted, wherein the spindle side contact portion and the tool side contact portion are engageable with each other in a state of being deviated from each other in the X-axis direction. In order to widen the groove width of the groove, it is necessary to cause the tool side contact portion to be deviated from the spindle side contact portion in the X-axis direction. In this regard, according to this configuration, even when the tool side contact portion is deviated from the spindle side contact portion, it is possible to ensure an engagement state between the spindle side contact portion and the tool side contact portion. Therefore, it is possible to suppress vibrations or elastic deformation of the tool even when the groove width is widened.

In another embodiment of the disclosure, a configuration may be adopted, wherein any one of the spindle side contact portion and the tool side contact portion has an engagement rib extending in the X-axis direction, and the other one has an engagement groove portion extending in the X-axis direction, the engagement rib is inserted into the engagement groove portion.

According to this configuration, even when the tool side contact portion is deviated from the spindle side contact portion, it is possible to ensure an engagement state between the engagement rib and the engagement groove portion. Therefore, it is possible to suppress vibrations or elastic deformation of the tool even when the groove width is widened.

Advantageous Effects

According to the disclosure, it is possible to provide a workpiece machining apparatus whose machining accuracy is less likely to be degraded.

REFERENCE SIGNS LIST

1: CNC LATHE (WORKPIECE MACHINING APPARATUS)

2: ROTARY TOOL UNIT, 20: TOOL BODY, 200: TOOL SIDE CONTACT PORTION, 200a: ENGAGEMENT RIB, 21: END MILL (TOOL), 24: GEAR UNIT, 240: SHAFT, 241: BEVEL GEAR, 25: GEAR UNIT, 250: SHAFT, 251: BEVEL GEAR, 26: SPUR GEAR, 27: HOLDER PORTION, 280: PULLEY, 281: BELT

4: TOOL REST, 40: TOOL REST BODY, 41: TURRET, 410: CENTRAL PORTION, 411: OUTER RING PORTION, 411a: ATTACHMENT SURFACE, 411b: ATTACHMENT HOLE, 42: X-AXIS SLIDE, 43: X-AXIS LOWER SLIDE, 44: Z-AXIS SLIDE, 45: Z-AXIS LOWER SLIDE, 46: GEAR UNIT, 460: SHAFT, 461: BEVEL GEAR, 47: GEAR UNIT, 470: SHAFT, 471: BEVEL GEAR

6: HEADSTOCK, 60: HEADSTOCK BODY, 61: SPINDLE, 62: CHUCK, 63: SUPPORT BAR (SUPPORT MEMBER), 630: SPINDLE SIDE CONTACT PORTION, 630a: ENGAGEMENT GROOVE PORTION

7: BED, 70: TILTING SECTION

9: WORKPIECE, 90: THROUGH-HOLE, 91: KEYWAY (GROOVE), 91a: SEMI-MACHINED GROOVE, 92: GROOVE

W1: GROOVE WIDTH

DESCRIPTION OF EMBODIMENTS

Hereinafter, embodiments will be described in which a workpiece machining apparatus according to the disclosure is embodied as a CNC lathe.

First Embodiment

[Configuration of CNC Lathe] First, a configuration of the CNC lathe according to the present embodiment will be described. In the following drawings, a Z-axis direction corresponds to rightward and leftward directions (spindle direction). An X-axis direction corresponds to rearward-upward and forward-downward directions. A Y-axis direction corresponds to rearward-downward and forward-upward directions. The Z-axis, the X-axis, and the Y-axis are orthogonal to one another.

Figure 1:
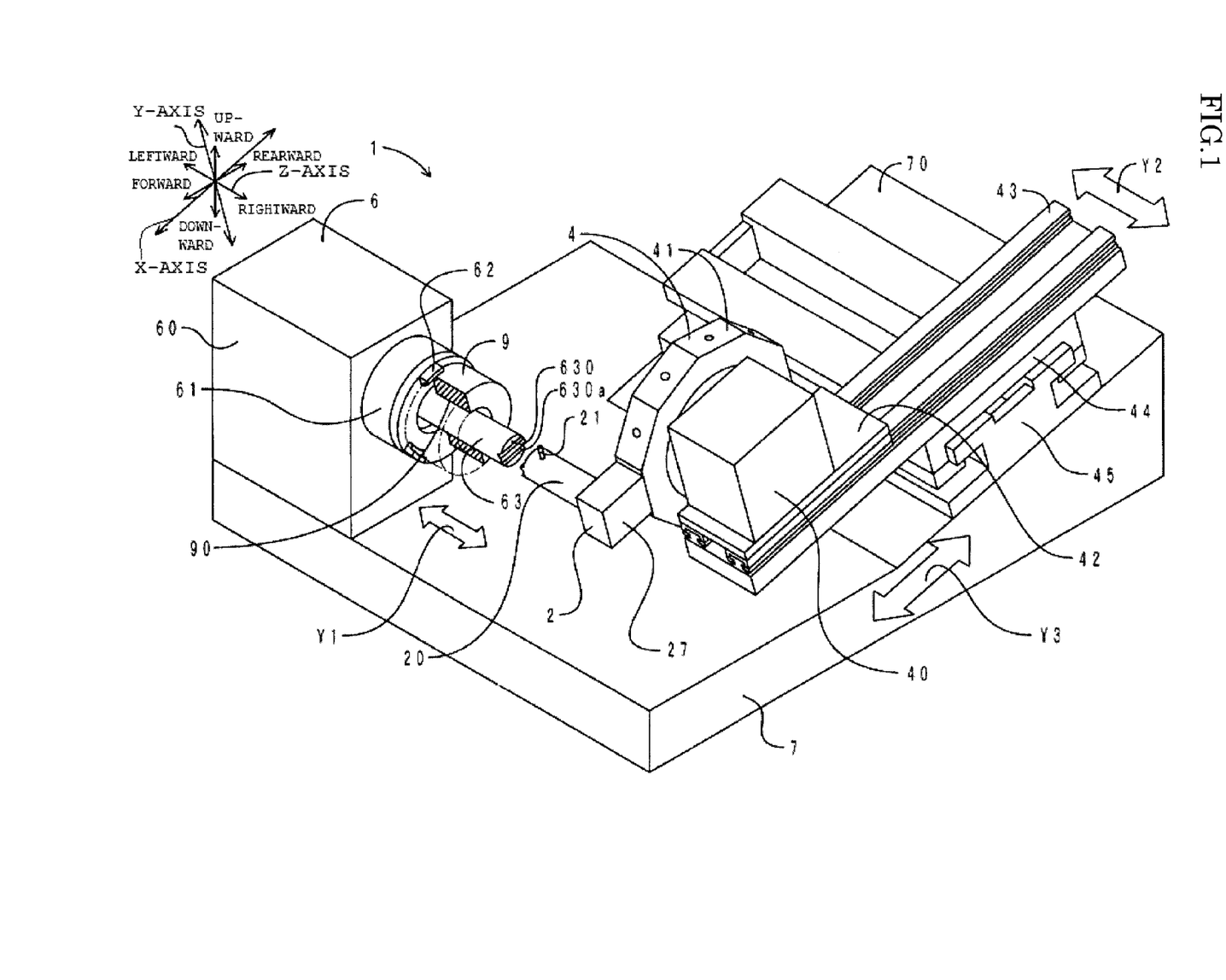
FIG. 1 is an internal perspective view of a CNC lathe according to a first embodiment.

FIG. 1 illustrates an internal perspective view of the CNC lathe according to the present embodiment. As illustrated in FIG. 1, a CNC lathe 1 includes a rotary tool unit 2, a tool rest 4, a headstock 6, and a bed 7.

The bed 7 is arranged on a floor surface of a factory. A tilting section 70 is arranged on a rear right side on an upper surface of the bed 7. The tilting section 70 has a sloped shape which tilts down facing forward from the rear thereof.

The headstock 6 is arranged on a left front side on the upper surface of the bed 7. The headstock 6 includes a headstock body 60, a spindle 61, a chuck 62, and a support bar 63. The support bar 63 is included in a concept of a "support member" according to the disclosure. The spindle 61 is disposed to protrude rightward from a right surface of the headstock body 60. The spindle 61 extends in rightward and leftward directions. The spindle 61 is rotatable around its own axis. The chuck 62 may be a three jaw chuck. The chuck 62 is arranged in a right end of the spindle 61. A cylindrical workpiece 9 is detachably fixed to the chuck 62. That is, a through-hole 90 extending in the rightward and leftward directions is bored into the workpiece 9. The support bar 63 has a circular bar shape extending in the rightward and leftward directions. The support bar 63 protrudes rightward from the headstock body 60. As illustrated by an arrow Y1 in FIG. 1, the support bar 63 is movable in the rightward and leftward directions. A right end surface of the support bar 63 is a spindle side contact portion 630. The spindle side contact portion 630 includes a pair of engagement groove portions 630a. The engagement groove portions 630a extend in the X-axis direction. Viewing from the X-axis direction, the engagement groove portions 630a have a V-shape. The pair of engagement groove portions 630a are arranged in the Y-axis direction.

The tool rest 4 includes a tool rest body 40, a turret 41, an X-axis slide 42, an X-axis lower slide 43, a Z-axis slide 44, a Z-axis lower slide 45, and two gear units (not illustrated).

The Z-axis lower slide 45 is arranged in the tilting section 70. As illustrated by an arrow Y2 in FIG. 1, the Z-axis slide 44 is movable with respect to the Z-axis lower slide 45 in the rightward and leftward directions. The X-axis lower slide 43 is arranged on an upper surface of the Z-axis slide 44. As illustrated by an arrow Y3 in FIG. 1, the X-axis slide 42 is movable with respect to the X-axis lower slide 43 in the X-axis direction. The tool rest body 40 is fixed to the X-axis slide 42. The turret 41 is arranged on the left side of the tool rest body 40. The Z-axis slide 44 and the X-axis slide 42 enable the turret 41, that is, the rotary tool unit 2 to move in the Z-axis direction and the X-axis direction.

Figure 2:
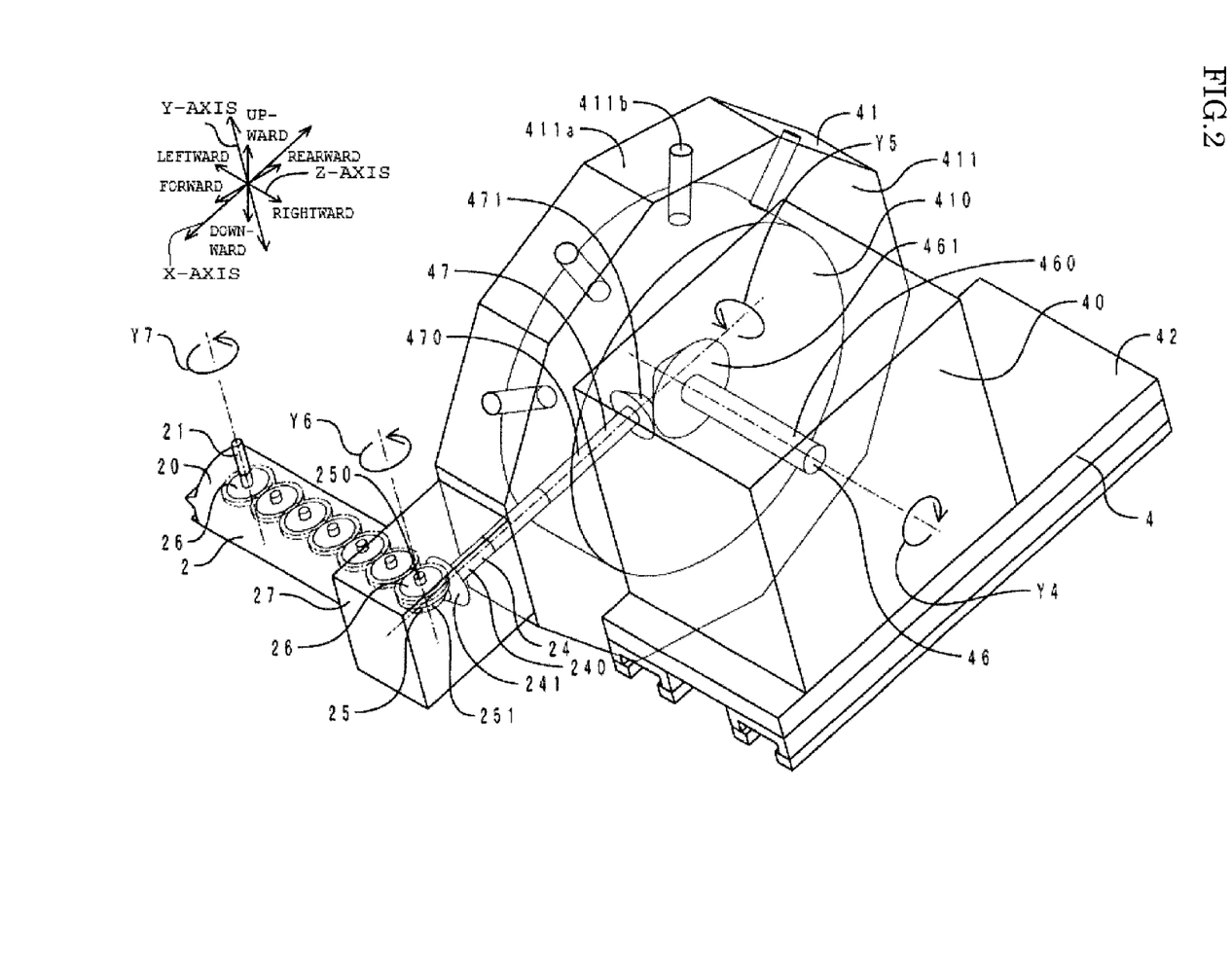
FIG. 2 is a transparent perspective view of an X-axis slide, a tool rest body, a turret, and a rotary tool unit in the CNC lathe.

FIG. 2 illustrates a transparent perspective view of the X-axis slide, the tool rest body, the turret, and the rotary tool unit in the CNC lathe according to the present embodiment. As illustrated in FIG. 2, the turret 41 includes a central portion 410 and an outer ring portion 411. The outer ring portion 411 has a decagonal shape. That is, the outer ring portion 411 includes ten attachment surfaces 411a. The rotary tool unit 2 (to be described later) can be attached to the respective ten attachment surfaces 411a. An attachment hole 411b extending in a radial direction is bored into the center of the attachment surface 411a. The outer ring portion 411 is rotatable around the central portion 410 at every 36°. That is, angle indexing is available.

A gear unit 46 is arranged inside the tool rest body 40 and the central portion 410. The gear unit 46 includes a shaft 460 and a bevel gear 461. The shaft 460 extends in the rightward and leftward directions. The shaft 460 extends from the tool rest body 40 to the central portion 410. The bevel gear 461 is arranged in the left end of the shaft 460. The bevel gear 461 is arranged inside the central portion 410. A drive force in the rotation direction can be transmitted from a motor (not illustrated) to the right end of the shaft 460.

A gear unit 47 is arranged inside the central portion 410. The gear unit 47 includes a shaft 470 and a bevel gear 471. The shaft 470 extends in the X-axis direction. The shaft 470 extends in a direction orthogonal to the shaft 460. The bevel gear 471 is arranged in the rear upper end of the shaft 470. The bevel gear 471 and the bevel gear 461 mesh with each other. The front lower end of the shaft 470 is connected to the attachment hole 411b on the front lower side of the shaft 470 among the ten attachment holes 411b of the outer ring portion 411. In other words, the ten attachment holes 411b are alternately connected to the shaft 470 by the outer ring portion 411 being rotated by 36°.

The rotary tool unit 2 includes a tool body 20, an end mill 21, gear units 24 and 25, seven spur gears 26, and a holder portion 27. The end mill 21 is included in a concept of a "tool" according to the disclosure.

Figure 3:
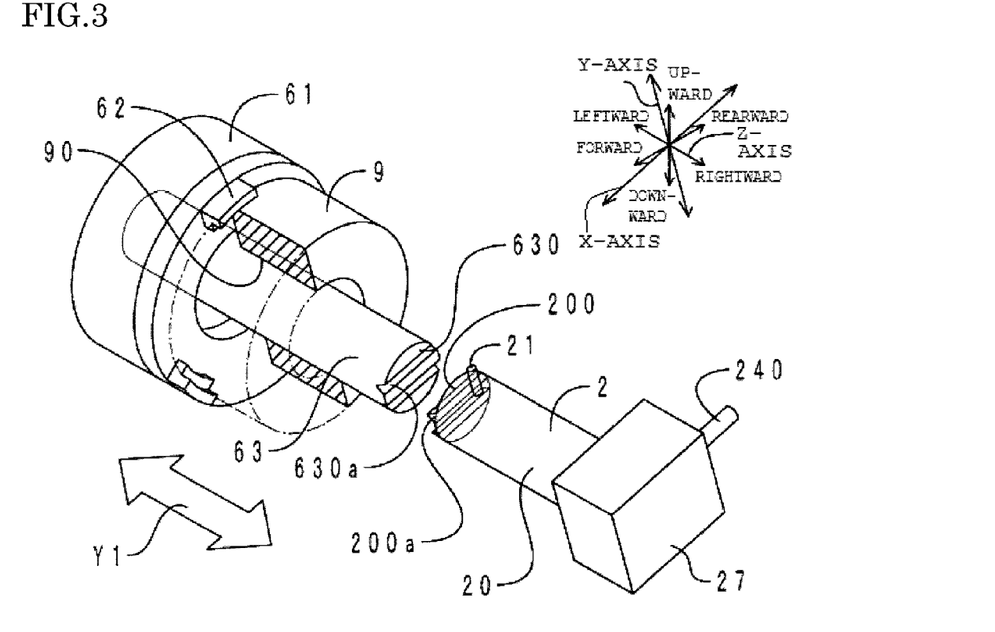
FIG. 3 is a perspective view of the rotary tool unit, a spindle, a chuck, and a support bar in the CNC lathe.

FIG. 3 illustrates a perspective view of the rotary tool unit, the spindle, the chuck, and the support bar in the CNC lathe according to the present embodiment. The holder portion 27 is detachably attached to the attachment surface 411a of the outer ring portion 411. The tool body 20 is disposed to protrude leftward from the left surface of the holder portion 27. The tool body 20 has a cylindrical shape extending in the rightward and leftward directions. A left end surface of the tool body 20 is a tool side contact portion 200. As transparently illustrated in FIG. 3, the tool side contact portion 200 includes a pair of engagement ribs 200a. The engagement ribs 200a extend in the X-axis direction. Viewing from the X-axis direction, the engagement ribs 200a have a V-shape. The pair of engagement ribs 200a are arranged in the Y-axis direction. The tool side contact portion 200 and the spindle side contact portion 630 oppose each other in the rightward and leftward directions. In addition, the pair of engagement ribs 200a and the pair of engagement groove portions 630a oppose each other in the rightward and leftward directions.

The end mill 21 is disposed to protrude outward in the radial direction from an outer peripheral surface in the vicinity of the left end of the tool body 20. The end mill 21 has a short axis cylinder shape extending in the Y-axis direction. A blade (not illustrated) is formed on the outer peripheral surface and the end surface on the front upper side of the end mill 21.

As illustrated in FIG. 2, the gear unit 24 includes a shaft 240 and a bevel gear 241. The shaft 240 extends in the X-axis direction. A rear upper side portion of the shaft 240 is inserted into the attachment hole 411b (attachment hole 411b on the front lower side of the shaft 470) of the outer ring portion 411. The rear upper end of the shaft 240 and the front lower end of the shaft 470 engage with each other so that rotation torques can be transmitted. A front lower side portion of the shaft 240 is arranged inside the holder portion 27. The bevel gear 241 is arranged in the front lower end of the shaft 240.

A gear unit 25 is arranged inside the holder portion 27. The gear unit 25 includes a shaft 250 and a bevel gear 251. The shaft 250 extends in the Y-axis direction. The shaft 250 extends in a direction orthogonal to the shaft 240. The bevel gear 251 is arranged in the rear lower end of the shaft 250. The bevel gear 251 and the bevel gear 241 mesh with each other.

The seven spur gears 26 are arranged inside the holder portion 27 and the tool body 20. The seven spur gears 26 connect the shaft 250 and the end mill 21 to each other so that power can be transmitted. The right end spur gear 26 among the seven spur gears 26 is arranged in the front upper end of the shaft 250. The left end spur gear 26 among the seven spur gears 26 is connected to the end mill 21. The remaining five spur gears 26 among the seven spur gears 26 connect the pair of spur gears 26 in both right and left ends to each other in the rightward and leftward directions.

A rotary mechanism of the end mill 21 will be described briefly. As illustrated in FIG. 2, if a motor is driven, the gear unit 46 is rotated around its own axis as illustrated by an arrow Y4. The bevel gear 461 of the gear unit 46 and the bevel gear 471 of the gear unit 47 mesh with each other. Therefore, as illustrated by an arrow Y5, the gear unit 47 is also rotated around its own axis. The bevel gear 471 of the gear unit 47 and the bevel gear 251 of the gear unit 25 mesh with each other. Therefore, as illustrated by an arrow Y6, the gear unit 25 is also rotated around its own axis. The right end spur gear 26 among the seven spur gears 26 is fixed to the shaft 250 of the gear unit 25. Therefore, the right end spur gear 26 is also rotated. The seven spur gears 26 mesh with one another. Therefore, as illustrated by an arrow Y7, the left end spur gear 26 among the seven spur gears 26 is also rotated. Accordingly, the end mill 21 connected to the left end spur gear 26 is also rotated around its own axis. In this manner, a motor inside the tool rest body 40 rotatably drives the end mill 21.

[Groove Forming Method Using CNC Lathe]

Next, a groove forming method using the CNC lathe according to the present embodiment will be described. The groove forming method has a first cutting process, an offset process, and a second cutting process.

(First Cutting Process)

Figure 4:
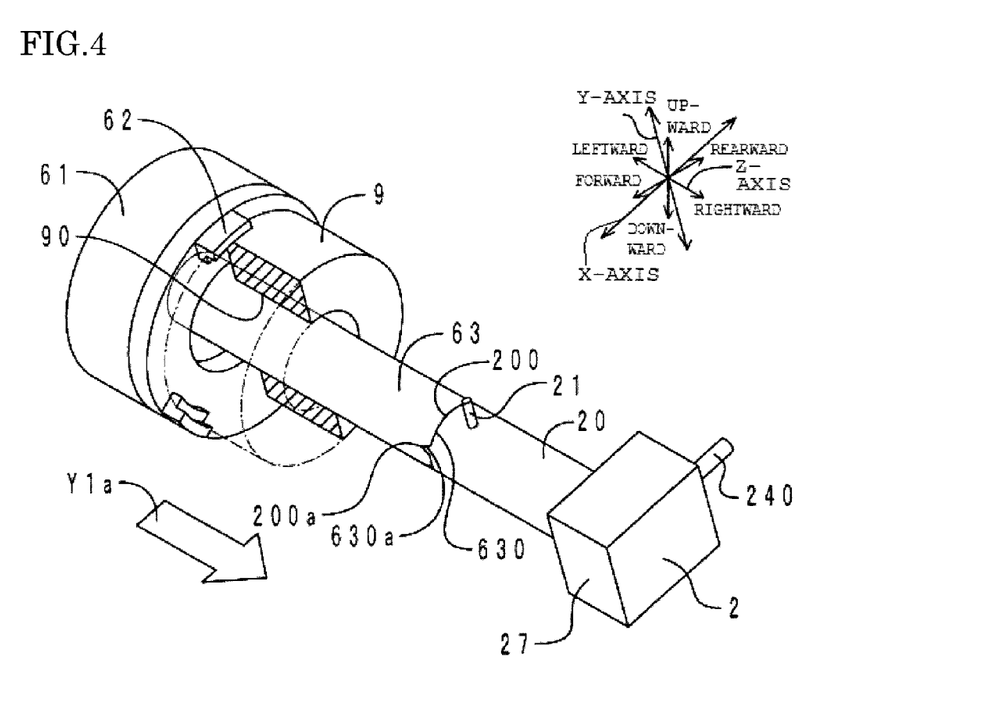
FIG. 4 is a perspective view of the rotary tool unit, the spindle, the chuck, and the support bar during a first stage of a first cutting process in a groove forming method.

FIG. 4 illustrates a perspective view of the rotary tool unit, the spindle, the chuck, and the support bar at a first stage of the first cutting process in the groove forming method. At the first stage, as illustrated by an arrow Y1a, the support bar 63 is caused to protrude rightward. The support bar 63 moves the radially inner sides of the spindle 61, the chuck 62, and the through-hole 90 of the workpiece 9. Then, the tool side contact portion 200 of the tool body 20 is brought into contact with the spindle side contact portion 630 of the support bar 63. At this time, the pair of engagement ribs 200a of the tool side contact portion 200 are caused to engage with the pair of engagement groove portions 630a of the spindle side contact portion 630. If this state is viewed from the right side, the tool body 20 is accommodated in the radially inner side of the through-hole 90. The end mill 21 partially overlaps a body portion in the vicinity of the through-hole 90 of the workpiece 9. The overlapping portion is a portion to be cut out.

Figure 5:
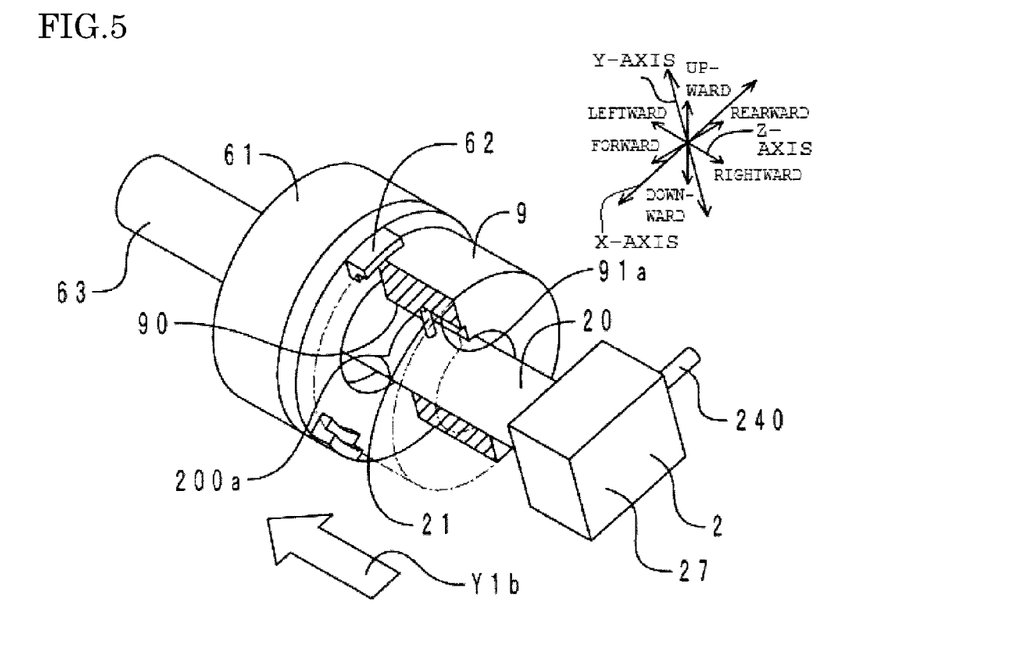
FIG. 5 is a perspective view of the rotary tool unit, the spindle, the chuck, and the support bar during an initial period of a second stage of the process.
Figure 6:
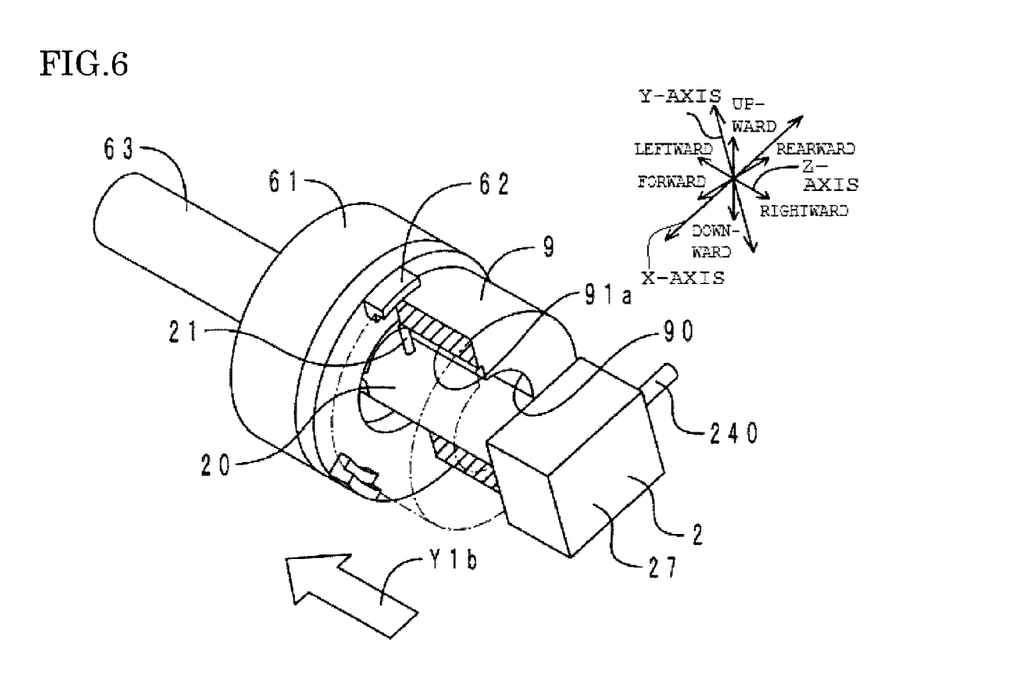
FIG. 6 is a perspective view of the rotary tool unit, the spindle, the chuck, and the support bar during the last period of the second stage of the process.

FIG. 5 illustrates a perspective view of the rotary tool unit, the spindle, the chuck, and the support bar during an initial period at a second stage of the process. FIG. 6 illustrates a perspective view of the rotary tool unit, the spindle, the chuck, and the support bar during the last period in the second stage of the process. In the second stage, the end mill 21 is rotated around its own axis. Thereafter, as illustrated by an arrow Y1b, while the support bar 63 and the tool body 20 are brought into contact with each other, the support bar 63 and the rotary tool unit 2 are moved leftward with respect to the workpiece 9. As illustrated by an arrow Y2 in FIG. 1, the rotary tool unit 2 is moved by moving the Z-axis slide 44 leftward. The movement causes the support bar 63 and the tool body 20 to move in the radially inner side of the through-hole 90. On the other hand, the end mill 21 cuts out the body portion of the workpiece 9 while being rotated around the its own axis and moving leftward. A semi-machined groove 91a extending in the rightward and leftward directions is formed on an inner peripheral surface of the through-hole 90. After the semi-machined groove 91a is formed, the support bar 63 and the rotary tool unit 2 move so as to be in a state illustrated in FIG. 4 (state where the end mill 21 is arranged on the right side of the through-hole 90).

(Offset Process)

Figure 7:
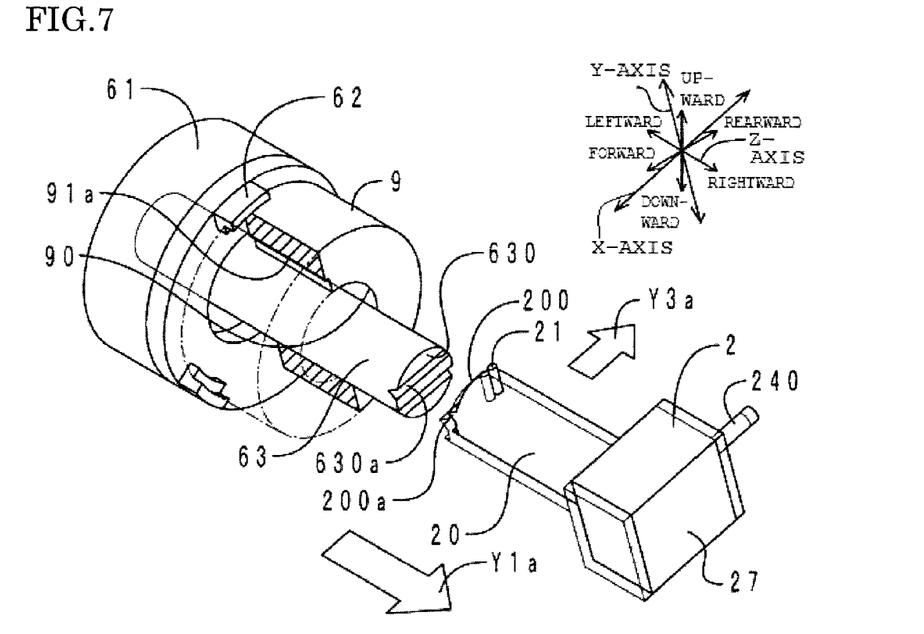
FIG. 7 is a perspective view of the rotary tool unit, the spindle, the chuck, and the support bar during an offset process in a groove forming direction.

FIG. 7 illustrates a perspective view of the rotary tool unit, the spindle, the chuck, and the support bar during an offset process in a groove forming direction. In this process, as illustrated by an arrow Y1a, the rotary tool unit 2 is first finely moved rightward. Then, the tool side contact portion 200 of the tool body 20 is separated from the spindle side contact portion 630 of the support bar 63. Thereafter, as illustrated by an arrow Y3a, the rotary tool unit 2 is finely moved rearward and upward. As illustrated by an arrow Y3 in FIG. 1, the rotary tool unit 2 is moved by moving the X-axis slide 42 rearward and upward.

(Second Cutting Process)

Figure 8:
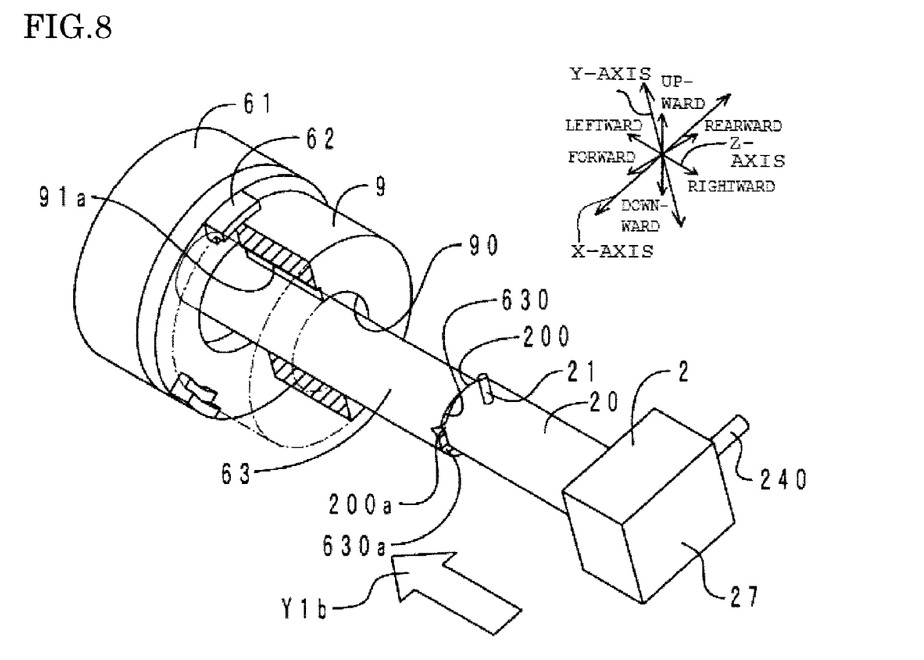
FIG. 8 is a perspective view of the rotary tool unit, the spindle, the chuck, and the support bar during a first stage of a second cutting process in the groove forming method.

FIG. 8 illustrates a perspective view of the rotary tool unit, the spindle, the chuck, and the support bar in a first stage of a second cutting process in a groove forming method. In the first stage, as illustrated by an arrow Y1b, the tool side contact portion 200 of the tool body 20 is brought into contact with the spindle side contact portion 630 of the support bar 63. At this time, the pair of engagement ribs 200a of the tool side contact portion 200 are caused to engage with the pair of engagement groove portions 630a of the spindle side contact portion 630.

Here, in the offset process, the rotary tool unit 2 is finely moved rearward and upward. Therefore, the tool body 20 is in contact with the support bar 63 in a state of being deviated rearward and upward from the support bar 63, that is, in the groove width direction of the semi-machined groove 91a.

Figure 9:
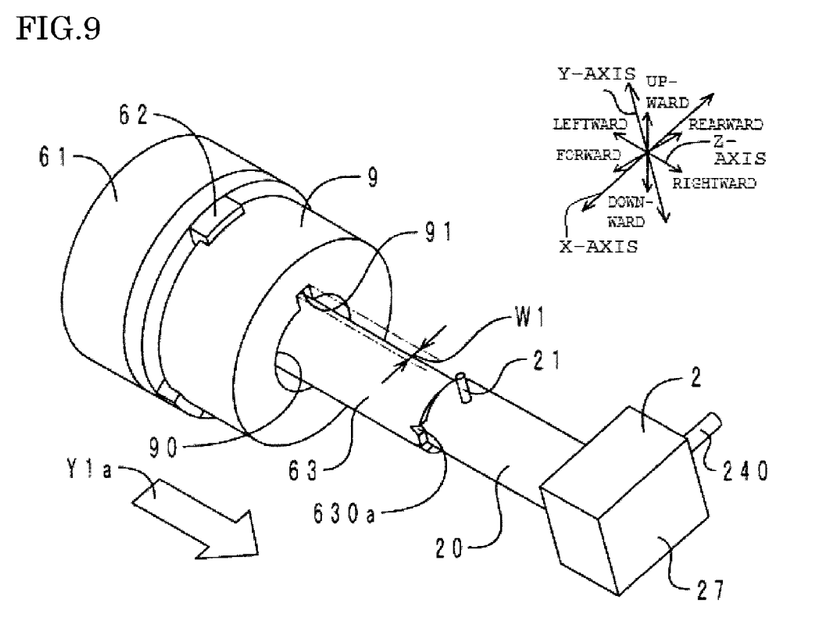
FIG. 9 is a perspective view of the rotary tool unit, the spindle, the chuck, and the support bar during a second stage of the process.

FIG. 9 illustrates a perspective view of the rotary tool unit, the spindle, the chuck, and the support bar in a second stage of the process. In the second stage, similarly to in FIGS. 5 and 6, the support bar 63 and the tool body 20 are moved leftward while both of these are deviated from each other in the X-axis direction. Then, the groove width of the semi-machined groove 91a is widened. Thereafter, as illustrated by an arrow Y1a in FIG. 9, the support bar 63 and the tool body 20 are moved rightward. In this manner, a keyway 91 which extends in the rightward and leftward directions and has a predetermined groove width W1 is formed on the inner peripheral surface of the through-hole 90 of the workpiece 9. The keyway 91 is included in a concept of a "groove" according to the disclosure.

(Operation Effect)

Next, an operation effect of the CNC lathe 1 according to the present embodiment will be described. According to the CNC lathe 1 of the present embodiment, when the keyway 91 is formed in the through-hole 90 as illustrated in FIG. 5, the rotary tool unit 2 can be held in the Z-axis direction by the support bar 63. Accordingly, it is possible to suppress vibrations or elastic deformation of the end mill 21. Therefore, machining accuracy of the keyway 91 is improved.

In addition, according to the CNC lathe 1 of the present embodiment, as illustrated in FIG. 1, the end mill 21 protrudes in the Y-axis direction with respect to the turret 41 which is movable in the Z-axis direction and the X-axis direction. The Y-axis direction corresponds to the groove depth direction of the keyway 91. The X-axis direction corresponds to the groove width direction of the keyway 91.

Therefore, it is possible to widen the groove width of the keyway 91 by moving the turret 41 in the X-axis direction.

In addition, if the end mill 21 protrudes in the X-axis direction, the X-axis direction is caused to correspond to the groove depth direction of the keyway 91, and the Y-axis direction is caused to correspond to the groove width direction of the keyway 91. Accordingly, in order to ensure a groove width widening function, it is necessary to increase movement mechanism (for example, a slide or the like) in the Y-axis direction in the existing tool rest 4. In contrast, according to the CNC lathe 1 of the present embodiment, it is possible to use the existing tool rest 4 without any change therein. Therefore, the apparatus is very versatile.

In addition, according to the CNC lathe 1 of the present embodiment, as illustrated in FIG. 3, the engagement groove portion 630a is arranged in the spindle side contact portion 630, and the engagement rib 200a is arranged in the tool side contact portion 200. The engagement groove portion 630a and the engagement rib 200a respectively extend in the X-axis direction. Accordingly, as illustrated in FIGS. 7 and 8, even when the tool side contact portion 200 is deviated from the spindle side contact portion 630 in the X-axis direction, it is possible to ensure an engagement state between the engagement groove portion 630a and the engagement rib 200a. Therefore, even when the groove width is widened, it is possible to suppress vibrations or elastic deformation of the end mill 21.

In addition, according to the CNC lathe 1 of the present embodiment, as illustrated in FIG. 9, the groove width W1 of the keyway 91 can be adjusted by using an offset amount of the tool body 20 with respect to the support bar 63 in the offset process.

In addition, according to the CNC lathe 1 of the present embodiment, as illustrated in FIG. 9, a groove width widening direction of the keyway 91 can be adjusted by using an offset direction of the tool body 20 with respect to the support bar 63 in the offset process.

Second Embodiment

Figure 10:
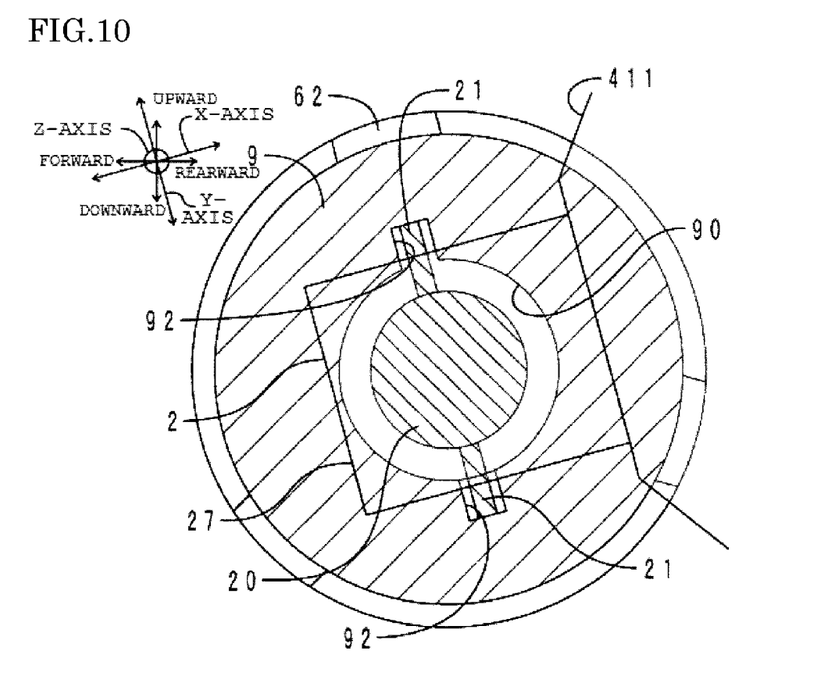
FIG. 10 is a transparent right side view in the vicinity of a rotary tool unit of a CNC lathe according to a second embodiment.

A CNC lathe according to the present embodiment is different from the CNC lathe according to the first embodiment in that a rotary tool unit therein includes two end mills. Hereinafter, only different points will be described. FIG. 10 illustrates a transparent right side view in the vicinity of the rotary tool unit of the CNC lathe according to the present embodiment. The same reference numerals are given to elements corresponding to FIGS. 1 and 3. In addition, FIG. 10 illustrates the workpiece 9 after a groove is completely formed therein. In addition, in order to facilitate description, hatching is performed on the workpiece 9, the tool body 20, and the end mill 21. As illustrated in FIG. 10, the rotary tool unit 2 includes two end mills 21. The two end mills 21 are arranged on the outer peripheral surface of the tool body 20 so as to oppose each other at 180° in the Y-axis direction.

The CNC lathe according to the present embodiment and the CNC lathe according to the first embodiment have the same operation effect with regard to elements having a common configuration. As in the present embodiment, the two end mills 21 may be arranged in the rotary tool unit 2. In this case, two grooves 92 opposing each other in the radial direction can be formed on the inner peripheral surface of the through-hole 90 at the same time.

Third Embodiment

A CNC lathe according to the present embodiment is different from the CNC lathe according to the first embodiment in that a grove forming method has a first cutting process, a first offset process, a second cutting process, a second offset process, and a third cutting process. Hereinafter, only different points will be described.

Figure 11A:
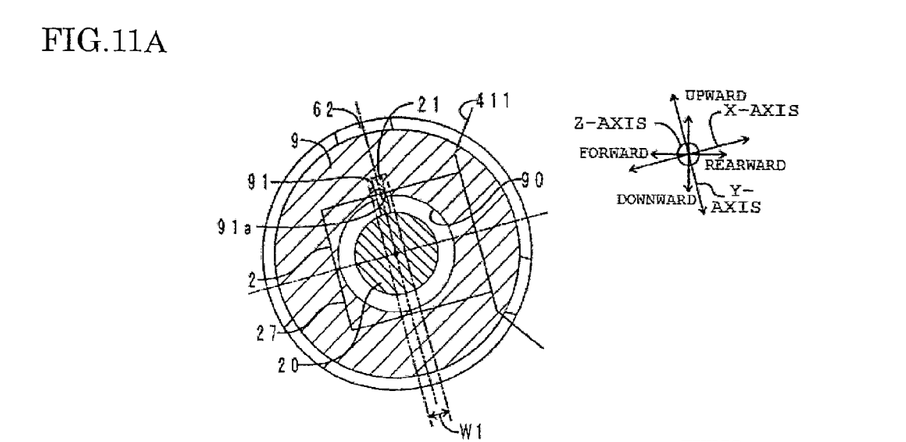
FIG. 11A is a transparent right side view in the vicinity of a rotary tool unit of a CNC lathe according to a third embodiment during a first cutting process in the groove forming method.
Figure 11B:
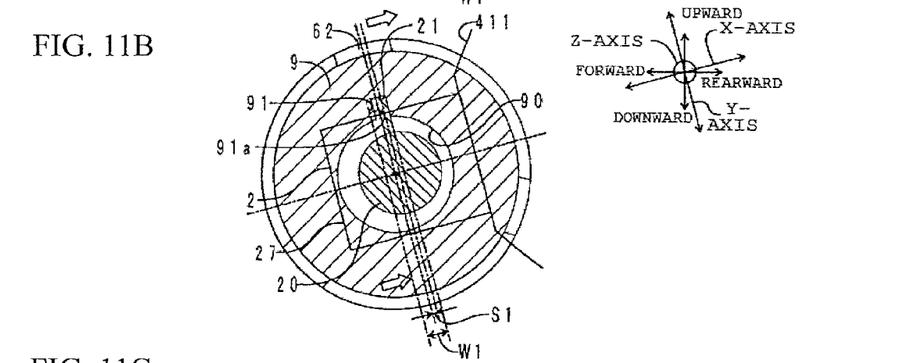
FIG. 11B is a transparent right side view in the vicinity of the rotary tool unit during a second cutting process in the groove forming method.
Figure 11C:
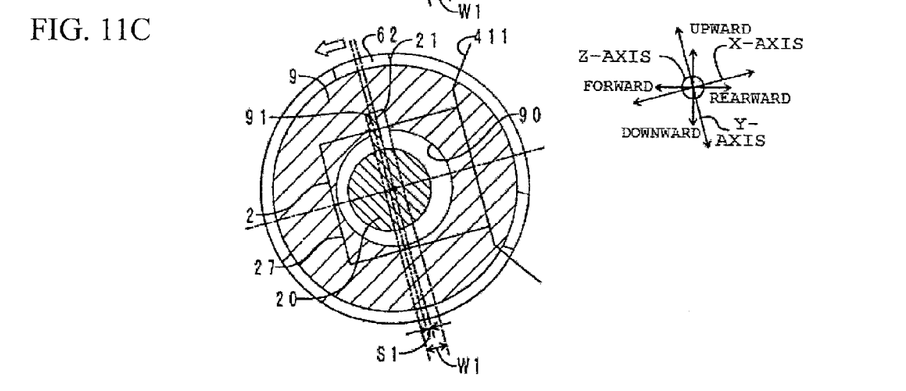
FIG. 11C is a transparent right side view in the vicinity of the rotary tool unit during a third cutting process in the groove forming method.

FIG. 11A illustrates a transparent right side view in the vicinity of a rotary tool unit of the CNC lathe according to the present embodiment during the first cutting process in the groove forming method. FIG. 11B illustrates a transparent right side view in the vicinity of the rotary tool unit during the second cutting process in the groove forming method. FIG. 11C illustrates a transparent right side view in the vicinity of the rotary tool unit during the third cutting process in the groove forming method. The same reference numerals are given to elements corresponding to FIGS. 1, 3, and 9.

As illustrated in FIG. 11A, during the first cutting process, the semi-machined groove 91a corresponding to a central portion in the groove width direction of the completely formed keyway 91 is formed. As illustrated in FIG. 11B, during the first offset process, the rotary tool unit 2 is moved by a predetermined offset amount S1 in rearward and upward directions (groove width direction). As illustrated in FIG. 11B, during the second cutting process, the groove width of the semi-machined groove 91a is widened by moving the end mill 21 in the rightward and leftward directions (Z-axis direction). As illustrated in FIG. 11C, during the second offset process, the rotary tool unit 2 is moved by the predetermined offset amount S1 (offset amount corresponding to the state illustrated in FIG. 11A) in forward and downward directions (groove width direction). As illustrated in FIG. 11C, during the third cutting process, the groove width of the semi-machined groove 91a is widened by moving the end mill 21 in the rightward and leftward directions (Z-axis direction). In this manner, the keyway 91 is formed three times through the cutting process.

The CNC lathe according to the present embodiment and the CNC lathe according to the first embodiment have the same operation effect with regard to elements having a common configuration. As in the present embodiment, the number of offset processes and cutting processes to be performed is not particularly limited. The number of offset processes and cutting processes to be performed may be appropriately set depending on the groove width W1 of the keyway 91, required machining accuracy, or the like. In addition, the offset direction and the offset amount S1 are not particularly limited, and may be appropriately set depending on the position and the groove width W1 of the keyway 91.

Another Embodiment

Hitherto, the embodiments of the workpiece machining apparatus according to the disclosure have been described. However, an embodiment is not limited to the above-described embodiments. Various modification examples and improved examples can be adopted by those skilled in the art.

Figure 12:
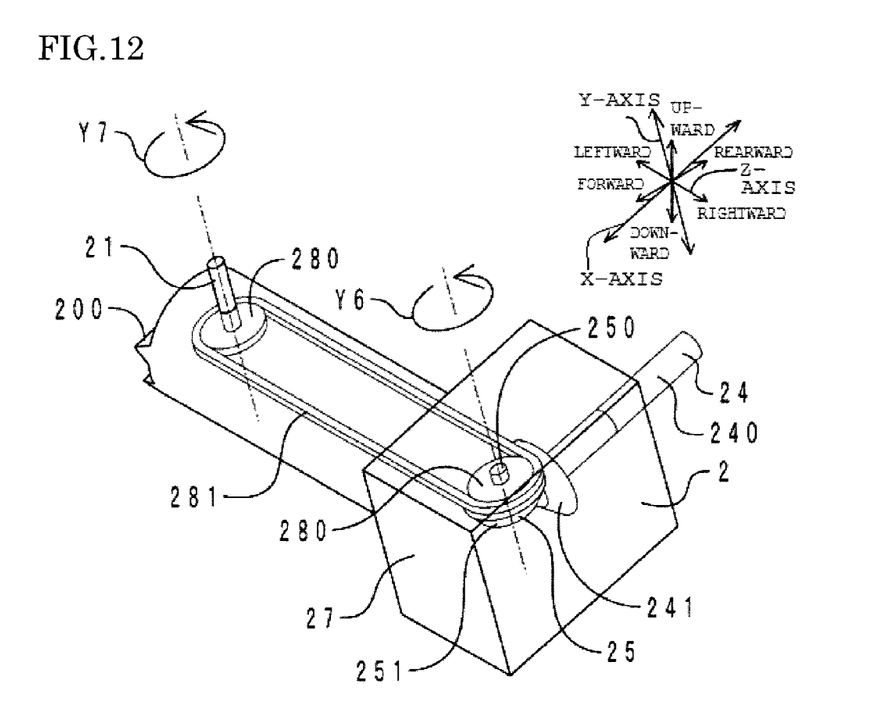
FIG. 12 is a transparent perspective view of a rotary tool unit of a CNC lathe according to another embodiment.

FIG. 12 illustrates a transparent perspective view of a rotary tool unit of a CNC lathe according to another embodiment. The same reference numerals are given to elements corresponding to FIG. 2. As illustrated in FIG. 12, the end mill 21 may be rotated by using a pair of pulleys 280 and a belt 281. That is, one of the pair of pulleys 280 may be connected to the gear unit 25, and the other one may be connected to the end mill 21. Then, the belt 281 may be wound around the pair of pulleys 280. In this way, a drive mechanism of the end mill 21 is not particularly limited.

In the above-described embodiments, the keyway 91 extending in the rightward and leftward directions is formed on the inner peripheral surface of the through-hole 90 of the workpiece 9. However, a spline, an inner gear, or the like can be formed therein. The spline, the inner gear, or the like is included in a concept of a "groove" according to the disclosure.

If the chuck 62 is rotated around the Z-axis, the workpiece 9 can be rotated. The groove forming method (refer to FIGS. 4 to 9) is executed so as to rotate the workpiece 9 by a predetermined angle and to stop the rotation, and the groove forming method is executed again. The spline or the inner gear can be formed on the inner peripheral surface of the through-hole 90 by repeatedly carrying out this work.

In the above-described embodiments, as illustrated in FIG. 7, the offset process is performed on the right side of the through-hole 90, but may be performed on the radially inner side of the through-hole 90. That is, the process may proceed to the second cutting process by performing the offset process immediately after the state illustrated in FIG. 6. In this case, it is possible to widen the groove width of the semi-machined groove 91a when the end mill 21 moves backward (when the through-hole 90 is moved rightward from the left side).

In the above-described embodiments, the engagement groove portion 630a is arranged in the spindle side contact portion 630, and the engagement rib 200a is arranged in the tool side contact portion 200. However, the engagement rib 200a may be arranged in the spindle side contact portion 630, and the engagement groove portion 630a may be arranged in the tool side contact portion 200. In addition, steps which extend in the X-axis direction so as to have shapes symmetrical with each other may be arranged in the spindle side contact portion 630 and the tool side contact portion 200.

In the above-described embodiments, the axial direction of the tool (end mill 21) is set to the Y-axis direction. However, the axial direction of the tool is not limited to the Y-axis direction. Any direction may be employed as long as the direction includes at least one component among the Z-axis direction, the X-axis direction, and the Y-axis direction.

In the above-described embodiments, the keyway 91 is formed in the through-hole 90 of the workpiece 9 by using the tool (end mill 21). However, the outer peripheral surface of the workpiece 9 may be machined by using the tool. In addition, an axial end surface of a workpiece may be machined by using the tool.

In the above-described embodiments, the end mill 21 is employed as a "tool" according to the disclosure. However, a milling cutter may be employed. The spindle direction of the CNC lathe 1 is not particularly limited. That is, the workpiece machining apparatus according to the invention may be embodied by employing a horizontal lathe, a face lathe, and a vertical lathe.

The invention claimed is:

1. A workpiece machining apparatus comprising:
a headstock to which a workpiece is attached when coordinate axes orthogonal to each other are set to a Z-axis and an X-axis;
a tool rest being movable in the Z-axis direction and the X-axis direction; and
a rotary tool unit attached to the tool rest,
wherein the headstock has a support member being movable in the Z-axis direction, the support member has a spindle side contact portion in an end portion in the Z-axis direction,
wherein the rotary tool unit has a tool body having a tool side contact portion with which the spindle side contact portion of the support member can come into contact in the Z-axis direction, and a tool protruding from the tool body and being rotatable around its own axis,
wherein the tool which is rotating machines the workpiece by moving the tool body in the Z-axis direction in a state where the spindle side contact portion and the tool side contact portion are brought into contact with each other,
wherein when a coordinate axis orthogonal to the Z-axis and the X-axis is set to a Y-axis, the tool protrudes from the tool body in the Y-axis direction,
wherein the workpiece has a through-hole extending in the Z-axis direction,
wherein the tool forms a groove extending in the Z-axis direction in the through-hole by moving the tool body inside the through-hole in the Z-axis direction, and
wherein the spindle side contact portion and the tool side contact portion are engageable with each other in a state of being deviated from each other in the X-axis direction.

2. The workpiece machining apparatus according to claim 1,
wherein any one of the spindle side contact portion and the tool side contact portion has an engagement rib extending in the X-axis direction, and the other one has an engagement groove portion extending in the X-axis direction, the engagement rib is inserted into the engagement groove portion.

* * * * *